United States Patent
Yamazaki

(10) Patent No.: US 11,308,151 B2
(45) Date of Patent: Apr. 19, 2022

(54) SEARCH SYSTEM, SEARCH METHOD, AND PROGRAM RECORDING MEDIUM

(71) Applicant: NEC Corporation, Tokyo (JP)

(72) Inventor: Shigeo Yamazaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 128 days.

(21) Appl. No.: 16/789,521

(22) Filed: Feb. 13, 2020

(65) Prior Publication Data

US 2020/0272654 A1 Aug. 27, 2020

(30) Foreign Application Priority Data

Feb. 22, 2019 (JP) .............................. JP2019-030099

(51) Int. Cl.
*G06F 16/535* (2019.01)
*G06F 16/538* (2019.01)
*G06K 9/00* (2006.01)
*G06F 16/583* (2019.01)

(52) U.S. Cl.
CPC .......... *G06F 16/535* (2019.01); *G06F 16/538* (2019.01); *G06F 16/583* (2019.01); *G06K 9/00228* (2013.01); *G06K 9/00288* (2013.01)

(58) Field of Classification Search
CPC ............ G06K 9/00288; G06K 9/00228; G06F 16/538; G06F 16/535
See application file for complete search history.

(56) References Cited

U.S. PATENT DOCUMENTS

| 9,349,037 B2 * | 5/2016 | Csefalvay ................. G06T 7/75 |
| 10,455,365 B1 * | 10/2019 | Saravanabhavan .......................... G06K 9/00771 |
| 2011/0038512 A1 * | 2/2011 | Petrou ................... G06F 16/532 382/118 |

(Continued)

FOREIGN PATENT DOCUMENTS

| JP | 2008-148053 A | 6/2008 |
| JP | 2009-059042 A | 3/2009 |

(Continued)

OTHER PUBLICATIONS

Japanese Office Action for JP Application No. 2019-030099 dated Sep. 17, 2019 with English Translation.

(Continued)

*Primary Examiner* — Mia M Thomas

(57) ABSTRACT

A search system includes a database, a face recognition unit, a similarity degree processing unit, and a search result output unit. The database stores image data. The face recognition unit detects a face from the image data stored in the database. When a target image indicating a search target person and an auxiliary image group including auxiliary image that assists a search for the search target person are designated, the face recognition unit evaluates whether a face detected from the image data is included in the target image and the auxiliary image group. The similarity degree processing unit determines whether the search target person is captured in the image data by using the evaluated result. The search result output unit acquires, from the database, the image data determined that the search target person is captured based on the determined result, and outputs a search result including the acquired image data.

17 Claims, 10 Drawing Sheets

(56) References Cited

U.S. PATENT DOCUMENTS

| | | | | |
|---|---|---|---|---|
| 2014/0023248 A1* | 1/2014 | Yoo | ................... | G06K 9/00288 |
| | | | | 382/118 |
| 2015/0213305 A1* | 7/2015 | Sundstrom | ......... | H04N 5/23218 |
| | | | | 382/118 |
| 2016/0078281 A1* | 3/2016 | Gongaware | ........ | G06K 9/00288 |
| | | | | 382/118 |
| 2016/0371305 A1* | 12/2016 | Qin | ......................... | G06F 16/58 |
| 2017/0178190 A1* | 6/2017 | Wu | ..................... | G06F 16/9535 |
| 2017/0339334 A1* | 11/2017 | De Bayser | .............. | G10L 15/22 |
| 2018/0233175 A1* | 8/2018 | Nir | ......................... | G11B 27/28 |
| 2018/0322147 A1* | 11/2018 | Petrou | ................. | G06F 16/9535 |
| 2019/0251191 A1* | 8/2019 | Bedadala | .............. | G06F 16/113 |
| 2020/0043118 A1* | 2/2020 | Sakaguchi | ........... | G06Q 50/265 |
| 2021/0056289 A1* | 2/2021 | Kochi | ................ | G06K 9/00268 |
| 2021/0326574 A1* | 10/2021 | Wu | ........................ | G06K 9/00 |

FOREIGN PATENT DOCUMENTS

| | | |
|---|---|---|
| JP | 5477017 B2 | 4/2014 |
| JP | 2014-102715 A | 6/2014 |
| JP | 5557911 B2 | 7/2014 |
| JP | 6139364 B2 | 5/2017 |

OTHER PUBLICATIONS

Japanese Office Action for JP Application No. 2019-227490 dated Nov. 10, 2020 with English Translation.

* cited by examiner

Fig.2

| IMAGE DATA | SIMILARITY DEGREE | | | | METADATA | | SIMILARITY DEGREE ANALYSIS |
|---|---|---|---|---|---|---|---|
| | TARGET IMAGE | AUXILIARY IMAGE 1 | AUXILIARY IMAGE 2 | AUXILIARY IMAGE 3 | TIME INFORMATION | POSITIONAL INFORMATION | |
| IMAGE 1 | 90 | 80 | 90 | 90 | T1 | P1 | HIGH |
| IMAGE 2 | 70 | 90 | 90 | 90 | T1' | P2 | LOW |
| IMAGE 3 | 50 | 90 | 90 | 90 | T1'' | P1' | MEDIUM |
| ... | ... | ... | ... | ... | ... | ... | ... |
| IMAGE n | 80 | 70 | 0 | 20 | T3 | P3 | HIGH |

140

SEARCH SYSTEM, SEARCH METHOD, AND PROGRAM RECORDING MEDIUM

This application is based upon and claims the benefit of priority from Japanese Patent Application No. 2019-030099, filed on Feb. 22, 2019, the disclosure of which is incorporated herein in its entirety by reference.

TECHNICAL FIELD

The example embodiments relates to a search system and the like that search for a target person from image data.

BACKGROUND ART

There is a use for selling an image captured at an event in which many people participate, by using a Web-based system. Such a use needs work for successively checking many images in which a great number of people are captured one by one by a user, and sorting out an image (hereinafter, referred to as a target image) in which a target person is captured. However, such sorting work takes time and effort when the number of images increases. Thus, a method of effectively and highly accurately extracting a target image from among many images is required.

In a case where a candidate for an image (hereinafter, referred to as a candidate image) in which a target person is captured can be automatically extracted by a face recognition technique when an image in which a target person is captured is extracted from many images, a user can save time and effort. However, when a candidate image is extracted by using a general face recognition technique, there is a possibility of failing to extract a target image. For example, in a person search using the face recognition technique, a face that does not look forward is more likely to be omitted from a search result due to low recognition accuracy. Further, there is a case in which a target person cannot be reliably detected due to effect of brightness, a shadow, and the like of a picture. Thus, a technique for identifying a person by using not only an image but also some sort of information other than an image is required.

Patent Literature 1 (Japanese Patent No. 5557911) discloses a method of using a social connection acquired from various applications (hereinafter, referred to as apps) for ranking of identification of a person in addition to a visual similarity degree acquired from an image. Patent Literature 1 discloses an example of using a social connection metric acquired from a communication app, a social networking service (SNS) app, a calendar app, a joint app, and the like for ranking of person identification.

Patent Literature 2 (Japanese Patent No. 5477017) discloses a method of estimating strength of a human relationship by using an attribute and classification, such as a date of birth, a place of employment, an educational background, a hobby, a special skill, and a club in addition to a face image of a person, and evaluating a person with whom a content needs to be shared.

Patent Literature 3 (Japanese Patent No. 6139364) discloses a device that identifies a search target person captured in a target image. The device in Patent Literature 3 estimates a movement pattern of a person captured in a plurality of images, based on an image capturing time and an image capturing place of the plurality of images, and estimates a place having a high probability that the person captured in the image is present, based on the movement pattern of the person and an image capturing time of the target image. Then, the device in Patent Literature 3 estimates a person having a high probability of being present in the image capturing place at the image capturing time of the target image, based on an estimation result of the place having a high probability that the person is present, and identifies the search target person by comparing the person captured in the captured image with the search target person.

Since the method in Patent Literature 1 promotes identification of a person captured in an image by using a social connection metric acquired by using an app such as an SNS app and a calendar app, the method in Patent Literature 1 needs to cooperate with an app constructed as such an external system. Thus, the method in Patent Literature 1 has a problem that identification of a person cannot be performed in an environment in which the method cannot cooperate with the external system. Further, since the method in Patent Literature 1 identifies a person by using personal information such as the social connection metric, safety in terms of privacy is not sufficient.

Since the method in Patent Literature 2 estimates strength of a human relationship by using information related to an attribute and classification of a person, the method in Patent Literature 2 has a problem that there is a possibility that the human relationship cannot be accurately searched when information being previously registered is incorrect or old.

In order to identify a search target person captured in a target image, the method in Patent Literature 3 needs to extract a person as a candidate for the search target person by using an image captured before the target image. Thus, when a person captured in the image captured before the target image looks aside or slantingly, a problem arises that a movement pattern of the person cannot be estimated, and there is a possibility that a candidate for the search target person cannot be accurately extracted.

SUMMARY

An example object of the example embodiments is to solve the above-described problem, and provide a search system and the like capable of searching for a target person in a safe and highly accurate manner, based on a human relationship, without cooperating with an external system.

A search system according to one aspect of the example embodiments includes: a database in which at least one piece of image data being a selection target is stored; at least one memory storing instructions; and at least one processor connected to the at least one memory. The at least one processor executes the instructions to: detect a face from the image data being the selection target stored in the database; evaluate, when a target image indicating a search target person and an auxiliary image group including at least one auxiliary image that assists a search for the search target person are designated, whether a face detected from the image data being the selection target is included in the target image and the auxiliary image group; determine whether the search target person is captured in the image data, by using the evaluated result; acquire, from the database, the image data determined that the search target person is captured, based on the determined result; and output a search result including the acquired image data.

A search method according to one aspect of the example embodiments is a search method performed by a computer, and the search method includes: detecting a face from at least one piece of image data being a selection target stored in a database; evaluating, when a target image indicating a search target person and an auxiliary image group including at least one auxiliary image that assists a search for the search target person are designated, whether a face detected from the image data being the selection target is included in the target image and the auxiliary image group; determining whether the search target person is captured in the image data, by using an evaluation result; and acquiring, from the database, the image data determined that the search target person is captured, based on a determination result, and outputting a search result including the acquired image data.

A program according to one aspect of the example embodiments causes a computer to perform: processing of detecting a face from at least one piece of image data being a selection target stored in a database; processing of evaluating, when a target image indicating a search target person and an auxiliary image group including at least one auxiliary image that assists a search for the search target person are designated, whether a face detected from the image data being the selection target is included in the target image and the auxiliary image group; processing of determining whether the search target person is captured in the image data, by using an evaluation result; and processing of acquiring, from the database, the image data determined that the search target person is captured, based on a determination result, and outputting a search result including the acquired image data.

BRIEF DESCRIPTION OF THE DRAWINGS

Exemplary features and advantages of the example embodiments will become apparent from the following detailed description when taken with the accompanying drawings in which:

FIG. 2 is a table illustrating one example of a search result table stored in a similarity degree DB of the search system according to the first example embodiment;

EXAMPLE EMBODIMENT

Figure 1:
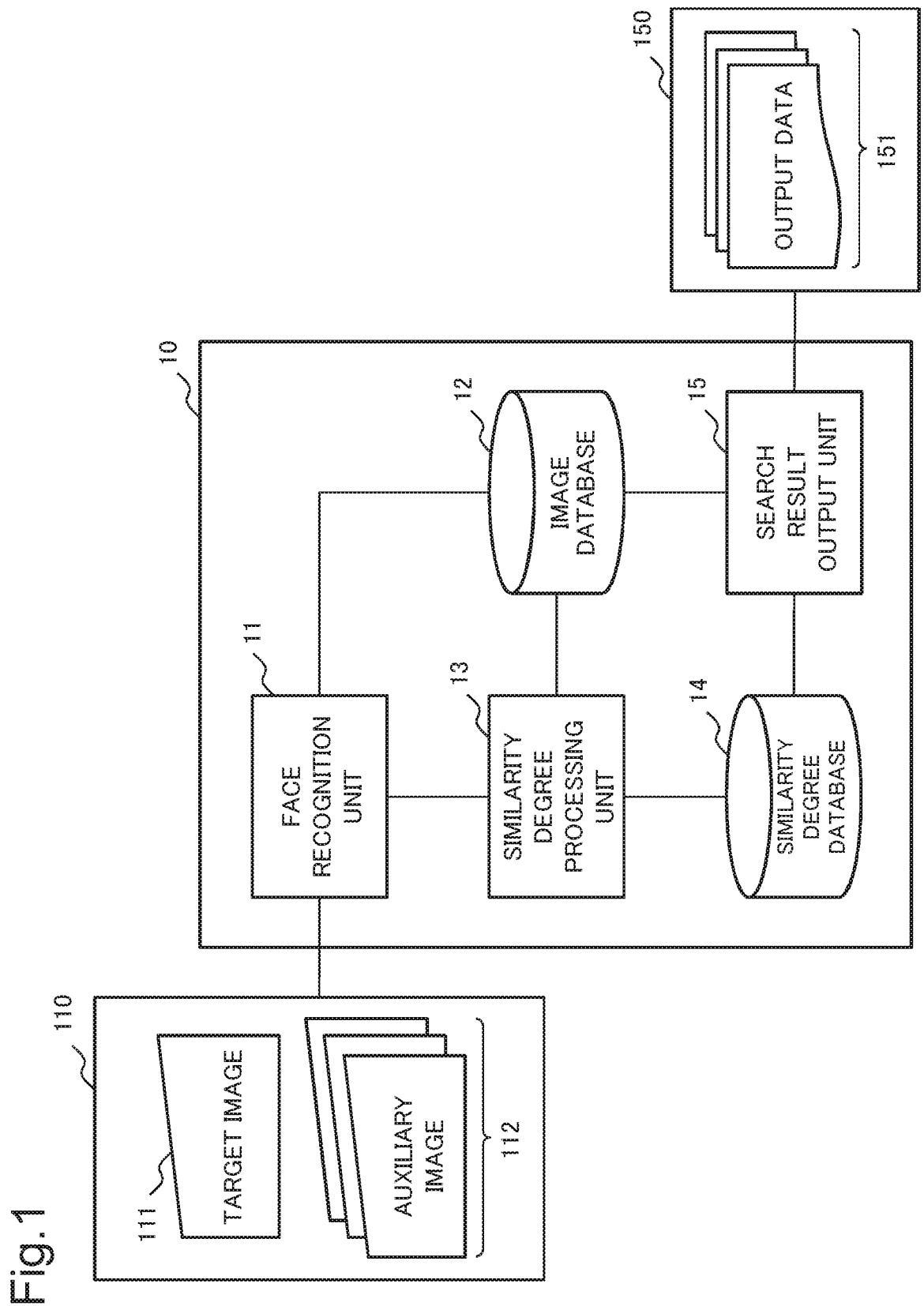
FIG. 1 is a block diagram illustrating one example of a configuration of a search system according to a first example embodiment.

Example embodiments will be described below with reference to the drawings. In the following example embodiments, technically preferable limitations are imposed to carry out the example embodiments, but the scope of this example embodiments is not limited to the following description. In all drawings used to describe the following example embodiments, the same reference numerals denote similar parts unless otherwise specified. In addition, in the following example embodiments, a repetitive description of similar configurations or arrangements and operations may be omitted.

First Example Embodiment

First, a search system according to a first example embodiment of the example embodiments will be described with reference to drawings. The search system according to the present example embodiment searches for image data in which a search target person is captured from at least one piece of image data being a selection target by using an image and/or a similarity degree stored in a database (DB).

(Configuration)

FIG. 1 is a block diagram illustrating one example of a configuration of a search system 10 according to the present example embodiment. As in FIG. 1, the search system 10 includes a face recognition unit 11, an image DB 12, a similarity degree processing unit 13, a similarity degree DB 14, and a search result output unit 15. The search system 10 is connected to an input device 110 and an output device 150.

The search system 10 searches for image data in which a search target person is captured from among image data stored in the image DB 12 by using a target image 111 and an auxiliary image group 112 provided from the input device 110. The search system 10 generates output data (also referred to as a search result) including the searched image data, and outputs an output data group 151 being a set of the generated output data to the output device 150.

The input device 110 is connected to the face recognition unit 11. The target image 111 being an image indicating a search target person and the auxiliary image group 112 being a set of at least one auxiliary image that assists a search for the target image 111 are input to the input device 110 by a user. The input device 110 outputs the input target image 111 and the input auxiliary image group 112 to the face recognition unit 11. The auxiliary image is an image indicating an associated person of the search target person. For example, the input device 110 is achieved by a terminal device including a monitor and/or a peripheral apparatus such as a keyboard, a mouse, a touch panel being connected to the terminal device. An image indicating a person is, for example, an image including a region of a face of a person.

The face recognition unit 11 is connected to the input device 110. Further, the face recognition unit 11 is connected to the image DB 12 and the similarity degree processing unit 13. The target image 111 and the auxiliary image group 112 are provided to the face recognition unit 11 from the input device 110.

When the target image 111 and the auxiliary image group 112 are provided, the face recognition unit 11 successively extracts at least one piece of image data being a selection target from the image DB 12. The face recognition unit 11 detects a face from each piece of the image data extracted from the image DB 12. The face recognition unit 11 performs calculation of a similarity degree between the face (image indicating a region of the face) detected from the image data, and the target image 111 and the auxiliary image group 112. The face recognition unit 11 verifies the face detected from the image data with the target image 111 and the auxiliary image group 112, and outputs the similarity degree (also referred to as an evaluation result of face recognition) acquired by the verification to the similarity degree processing unit 13. Note that a general technique may be used for face detection and/or face recognition. The similarity degree may be a ratio, and may be a numerical value with an upper limit value and a lower limit value being set.

For example, the user inputs a person image of a search target person as the target image 111, and a person image of at least one person that assists a search as the auxiliary image is provided to the search system 10 by using the input device 110. For example, when a site that sells a picture of a school trip is assumed, an image of a child of the user is provided as the target image 111 to the search system 10, and an image of a friend who acts together with the child in the same team is provided as the auxiliary image.

The image DB 12 (also referred to as a first database) is connected to the face recognition unit 11, the similarity degree processing unit 13, and the search result output unit 15. The image DB 12 is a database in which image data being a selection target are stored. For example, when the search system 10 is used for a purpose of selling a picture captured on a school trip, image data about an image captured on the trip are accumulated as image data being a selection target in the image DB 12.

For example, image data being a selection target and an image capturing condition (metadata) when the image data are captured are associated with each other and stored in the image DB 12. For example, image data in a form of an exchangeable image file format (Exif) are stored in the image DB 12. For example, metadata of image data being a selection target include image capturing date and time at which the image data are captured and/or global positioning system (GPS) information associated with positional information about an image capturing position.

The similarity degree processing unit 13 is connected to the face recognition unit 11, the image DB 12, and the similarity degree DB 14. The similarity degree processing unit 13 acquires the evaluation result of face recognition from the face recognition unit 11. When acquiring the evaluation result of the face recognition, the similarity degree processing unit 13 determines whether a search target person is captured in the image data stored in the image DB 12 by using the metadata of the image data. The determination will be described later. The similarity degree processing unit 13 stores a determination result in the similarity degree DB 14.

The similarity degree DB 14 (also referred to as a second database) is connected with the similarity degree processing unit 13 and the search result output unit 15. The similarity degree DB 14 is a database in which the determination result of by the similarity degree processing unit 13 is stored.

The search result output unit 15 is connected to the image DB 12 and the similarity degree DB 14. The search result output unit 15 acquires the determination result by the similarity degree processing unit 13 from the similarity degree DB 14. The search result output unit 15 acquires image data from the image DB 12, based on the determination result acquired from the similarity degree DB 14. Then, the search result output unit 15 acquires, from the image DB 12, image data associated with the determination result acquired from the similarity degree DB 14. The search result output unit 15 generates output data (also referred to as a search result) in a form of being processable in the output device 150 by using the image data acquired from the image DB 12. Note that the search result output unit 15 may include the metadata of the image data associated with the determination result in the output data. The search result output unit 15 outputs the output data group 151 being a set of the generated output data to the output device 150.

The output device 150 is connected to the search result output unit 15. The output data group 151 is provided to the output device 150 from the search result output unit 15. The output device 150 is a device for presenting a search result of the search system 10 to the user. For example, the output device 150 is achieved by a display device including a display. When the output device 150 is achieved by the display device, the output device 150 displays a search result of the search system 10 on a monitor of its own device. Further, for example, the output device 150 is achieved by a printer. When the output device 150 is achieved by the printer, the output device 150 prints a search result of the search system 10 on paper. Note that a method of outputting of a search result of the search system 10 is not particularly limited to the manner as long as the user can confirm the search result.

The description above is description of the configuration of the search system 10 according to the present example embodiment. Note that the configuration of the search system 10 in FIG. 1 is one example, and does not limit the configuration of the search system 10 according to the present example embodiment to the manner as it is.

[Determination Result]

Next, a determination result stored in the similarity degree DB 14 will be described by taking one example. FIG. 2 is a determination result table 140 being one example of a determination result stored in the similarity degree DB 14. In the determination result table 140, determination results related to n pieces of image data (images 1 to n) being selection targets are stored as one example.

In the determination result table 140, each column of the target image 111 and the auxiliary image group 112 (auxiliary image 1, auxiliary image 2, and auxiliary image 3) is a processing result of a similarity degree between the target image 111 and the auxiliary image group 112, and each piece of the image data.

In the determination result table 140, a column of time information indicates information related to an image capturing time of the image data being the selection target included in metadata of the image data. Note that, in the determination result table 140, it is assumed that T1, T1', and T1" are substantially the same time, and the other times are separated from one another.

In the determination result table 140, each column of positional information indicates information related to an image capturing place (such as a geotag) of the image data being the selection target included in the metadata of the image data. In the determination result table 140, it is assumed that P1 and P1' are substantially the same position, and the other positions are separated from one another.

In the determination result table 140, a column of a similarity degree analysis indicates a determination result whether a search target person is captured in each of the images, based on the similarity degree and/or the metadata. The determination result indicates a certainty degree of the search target person being captured in the image data. The determination result table 140 indicates an example of the similarity degree analysis that identifies a determination result in three levels of "high", "medium", and "low".

In FIG. 2, a similarity degree of the image 1 with the target image 111 is 90% (percent) higher than a threshold value. Thus, there is a high possibility that the search target person is captured in regard to the image 1. In this case, the similarity degree processing unit 13 sets the similarity degree analysis to "high".

A similarity degree of the image 2 with the target image 111 is 70%. In regard to the image 2, the similarity degree is 70%, which is relatively high. Meanwhile, the similarity degree processing unit 13 detects, from the metadata, that image capturing places are different even though the image capturing time T1 of the image 1 and the image capturing time T1' of the image 2 are substantially the same time. In this case, there is a low possibility that the search target person is captured in the image 2, and thus the similarity degree processing unit 13 sets the similarity degree analysis to "low".

A similarity degree of the image 3 with the target image 111 is 50%. In regard to the image 3, the similarity degree is 50%, which is low. Meanwhile, the similarity degree processing unit 13 detects, from the metadata, that the image 1 and the image 3 are captured at substantially the same time in substantially the same position. Further, the similarity degree processing unit 13 detects that a person having a high similarity degree with the auxiliary images 1 to 3 is captured at the same time. For example, in a case of an image captured on a trip of elementary school children, when a team of a child being a search target is active at the time in the position, there is a high possibility that the child is captured together in the same image. From these determinations, the similarity degree processing unit 13 sets the similarity degree analysis of the image data to "medium" in regard to the image 3.

For the image n, the similarity degree processing unit 13 determines that image capturing is performed in another scene since a similarity degree with the auxiliary images 2 to 3 is low, but both of a time and a position are separated from those of the images 1 to 3 and the like. For this reason, in regard to the image n, the similarity degree with the auxiliary image does not affect the similarity degree analysis, and thus the similarity degree processing unit 13 sets the similarity degree analysis to "high" since a similarity degree with the target image is 80%, which is high.

The search result output unit 15 refers to the similarity degree analysis stored in the similarity degree DB 14, and extracts the image data whose similarity degree analysis is "high" and "medium" from the image DB 12. The search result output unit 15 generates output data that are displayable on the monitor of the output device 150 by using the image data extracted from the image DB 12. The search result output unit 15 outputs the generated output data to the output device 150.

For example, the search result output unit 15 generates a thumbnail of each of the images whose similarity degree analysis is "high" and "medium" and output data in html format in which a full-size image can be displayed from the thumbnail. Note that the full-size image referred from the thumbnail may not be an actual full-size image, and may be an enlarged image from which the user can make a determination.

The output device 150 acquires the output data from the search result output unit 15. The output device 150 displays a search result of the search system 10 on the monitor of the search system 10. For example, the output device 150 displays the images whose similarity degree analysis is "high" and "medium" in different display regions. The user who sees the monitor of the output device 150 can confirm the image according to the similarity degree analysis, and thus the user is freed from a burden of confirming all images being selection targets. Note that, when classification of the similarity degree analysis is subdivided into "high" and "medium", the user may feel a new burden from a distinction between an image of "high" and an image of "medium" in the similarity degree analysis. Thus, the similarity degree analysis of images confirmed by the user may be set in one level instead of being set in the two levels of "high" and "medium". On the other hand, there may also be a scene where classification of the similarity degree analysis may be subdivided in more detail. In this case, categorization of the similarity degree analysis may be set in more detail. In other words, classification of the similarity degree analysis can be adjusted to appropriate categorization according to a purpose.

Figure 3:
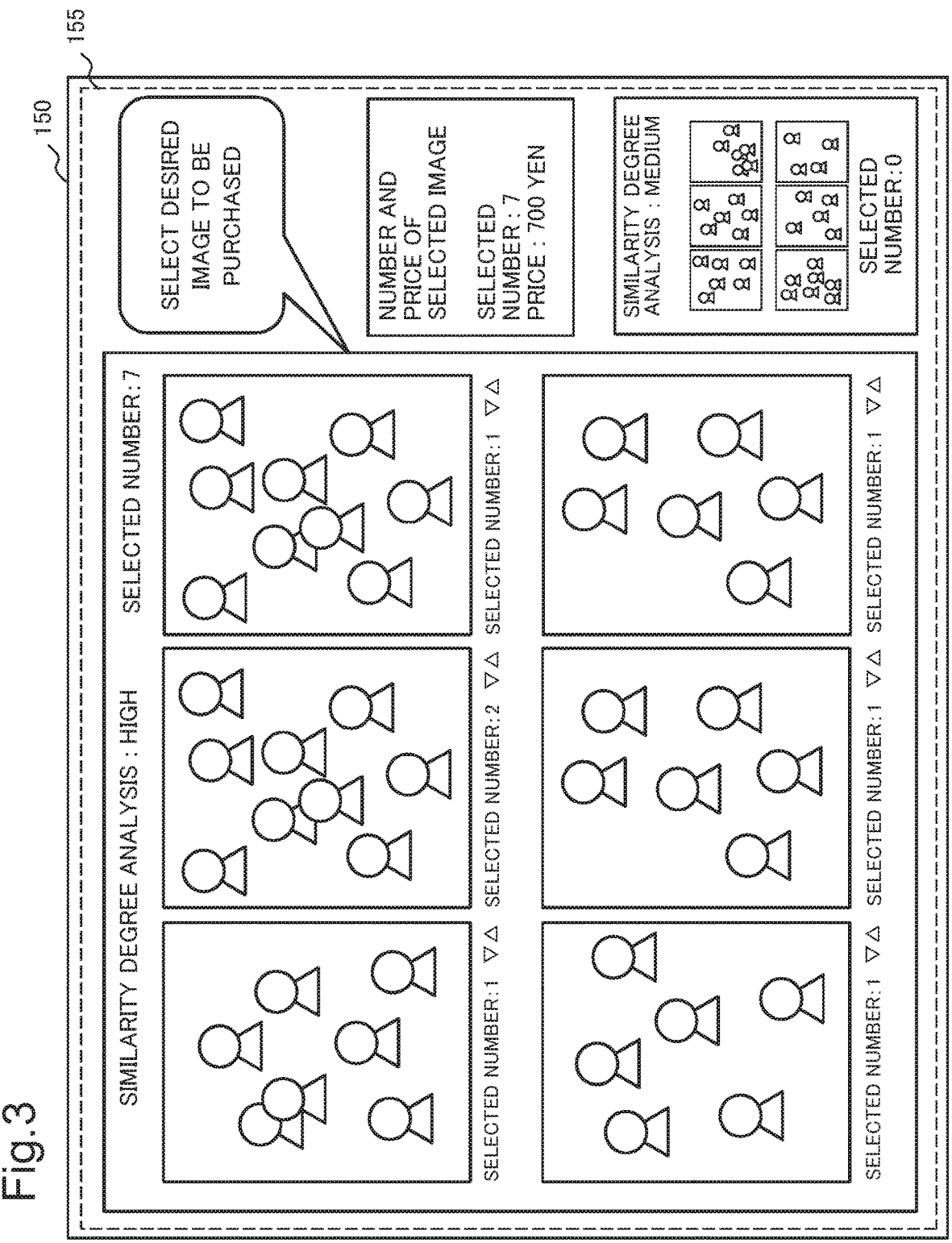
FIG. 3 is a schematic diagram illustrating one example of causing a monitor to display output data of the search system according to the first example embodiment.
Figure 4:
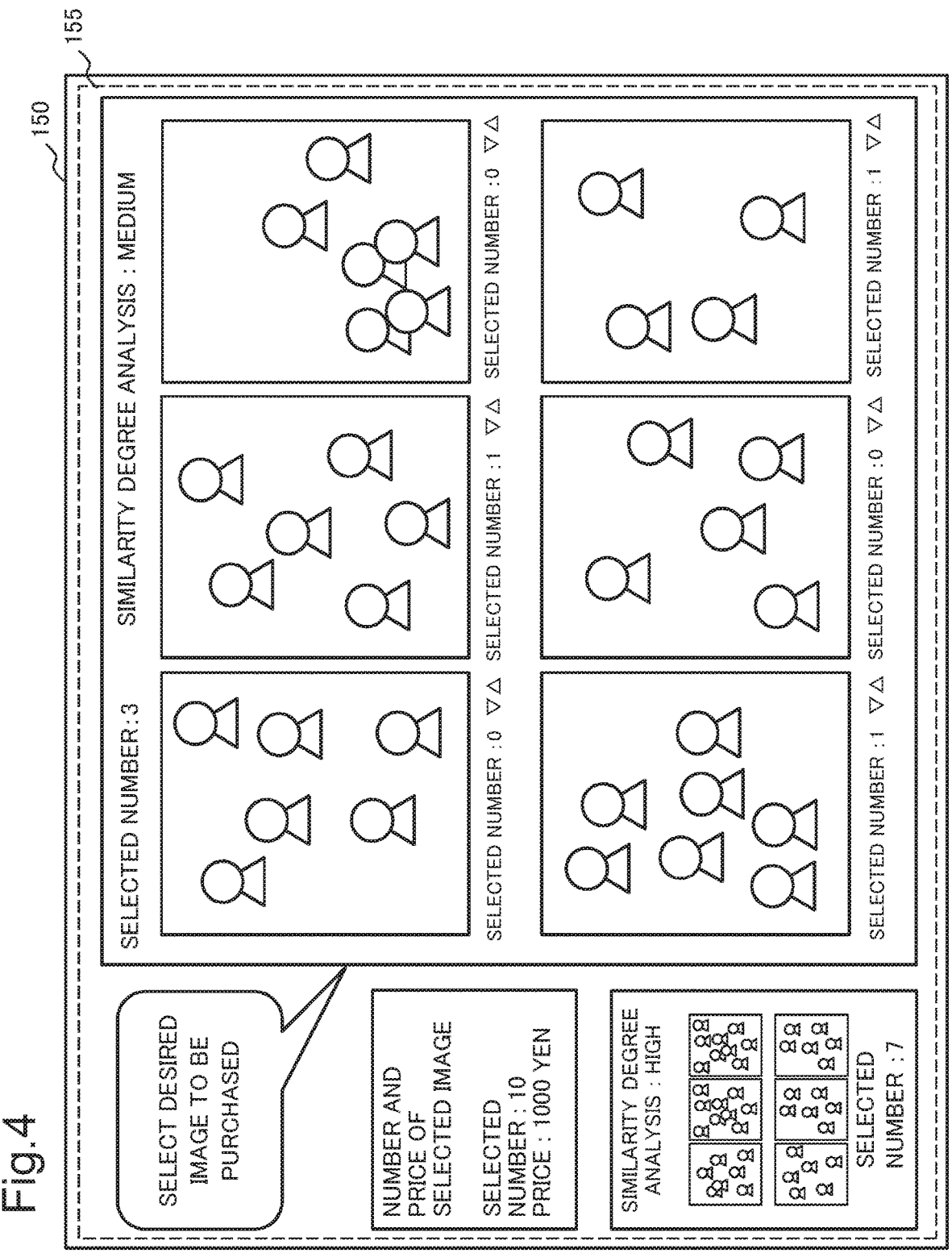
FIG. 4 is a schematic diagram illustrating another example of causing the monitor to display output data of the search system according to the first example embodiment.

FIGS. 3 and 4 are examples of causing the monitor of the output device 150 to display a user interface 155 (also referred to as a first user interface) that allows a selection of searched image data according to the similarity degree analysis. FIGS. 3 and 4 illustrate examples of causing the monitor to display the user interface 155 that separates an image data group whose similarity degree analysis is "high" and an image data group whose similarity degree analysis is "medium", and allows the user to select desired image data to be purchased.

The user interface 155 in FIG. 3 displays enlarged image data whose similarity degree analysis is "high" as one example. In FIG. 3, it is assumed as one example that seven pieces of the image data whose similarity degree analysis is "high" are selected, and image data whose similarity degree analysis is "medium" are not selected. When one piece of the image data can be purchased for 100 yen, a total number of the selected images is seven, and thus a purchase price is displayed as 700 yen.

The user interface 155 in FIG. 4 displays enlarged image data whose similarity degree analysis is "medium" as one example. In FIG. 4, it is assumed as one example that three pieces of the image data whose similarity degree analysis is "medium" are selected, and the seven pieces of the image data whose similarity degree analysis is "high" are already selected. When one piece of the image data can be purchased for 100 yen, a total number of the selected images is ten, and thus a purchase price is displayed as 1000 yen.

FIGS. 2 to 4 above illustrate the examples of storing the similarity degree analysis in the three levels of "high", "medium," and "low" of all pieces of the image data in the similarity degree DB 14. However, the similarity degree analysis may not be a determination by levels, and may be subdivided by a percentage and the like. When the similarity degree analysis is subdivided, search accuracy can be more minutely set.

For example, the search system 10 can be configured as a system that is local to a terminal device operated by the user. Further, as one example, the search system 10 can be configured such that input of the target image 111 and/or the auxiliary image group 112 and/or display of a search result are performed by a terminal device operated by the user, such as a personal computer and a smartphone. Further, the search system 10 may be configured as a computer resource connected, via the Internet, to a terminal device operated by the user.

(Operation)

Figure 5:
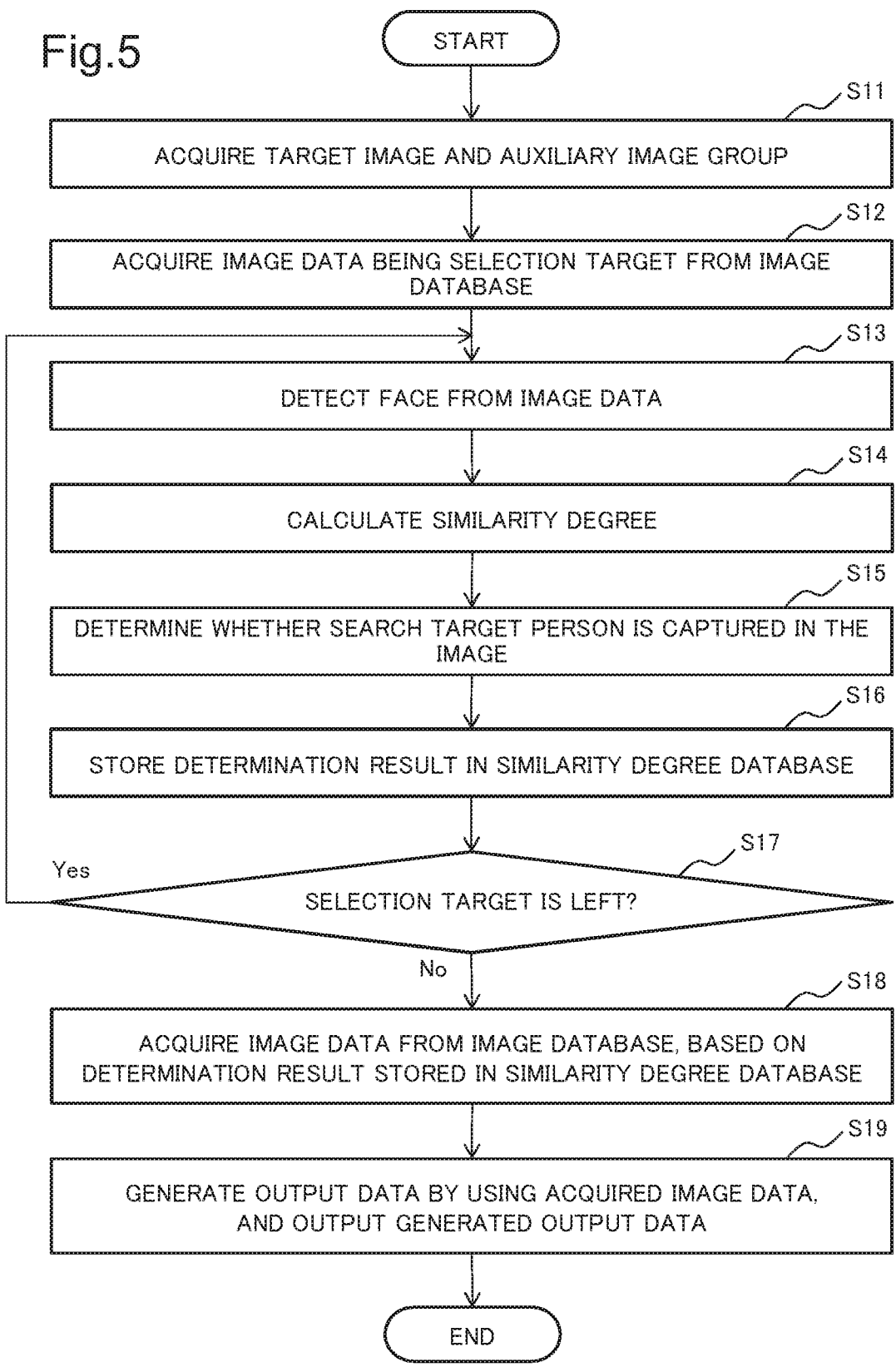
FIG. 5 is a flowchart for describing an operation of the search system according to the first example embodiment.

Next, an operation of the search system 10 according to the present example embodiment will be described with reference to a drawing. FIG. 5 is a flowchart for describing the operation of the search system 10. The operation of the search system 10 is subject in the description according to the flowchart in FIG. 5.

In FIG. 5, first, the search system 10 acquires the target image 111 and the auxiliary image group 112 input from the input device 110 (step S11).

Next, the search system 10 extracts image data being a selection target from the image DB 12 (step S12). Note that, when a plurality of pieces of image data are processed together, the plurality of pieces of image data may be collectively extracted from the image DB 12.

Next, the search system 10 detects a face from the image data extracted from the image DB 12 (step S13). Note that, when a plurality of selection targets are processed together, the face may be detected collectively from the plurality of pieces of image data extracted from the image DB 12.

Next, the search system 10 calculates a similarity degree between the face detected from the image data being the selection target, and the target image 111 and the auxiliary image group 112 (step S14). Note that, when a plurality of images are processed together, similarity degrees between faces detected from the plurality of image data, and the target image 111 and the auxiliary image group 112 may be collectively calculated.

Next, the search system 10 determines whether a search target person is captured in the image data stored in the image DB 12 by using the calculated similarity degree and metadata of the image data (step S15). Note that, when the metadata of the image data being the selection target are not used for the determination whether the search target person is captured in the image data, the search system 10 makes a determination by using the calculated similarity degree.

Next, the search system 10 stores, in the similarity degree DB 14, a determination result whether the search target person is captured in the image data being the selection target (step S16).

When the image data being the selection target are left (Yes in step S17), the processing returns to step S13. On the other hand, when the image data being the selection target are not left (No in step S17), image data are acquired from the image DB 12, based on the determination result stored in the similarity degree DB 14 (step S18). Then, the search system 10 generates output data by using the image data acquired from the image DB 12, and outputs the generated output data to the output device 150 (step S19).

The description above is description of the operation of the search system 10 according to the flowchart in FIG. 5. Note that the operation of the search system 10 according to the flowchart in FIG. 5 is one example, and does not limit the operation of the search system 10 according to the present example embodiment to the procedure as it is.

As described above, the search system according to the present example embodiment includes the first database, the face recognition unit, the similarity degree processing unit, the second database, and the search result output unit.

At least one piece of image data being a selection target are stored in the first database. The face recognition unit detects a face from the image data being the selection target stored in the first database. When a target image indicating a search target person and an auxiliary image group including at least one auxiliary image that assists a search for the search target person are designated, the face recognition unit evaluates whether the face detected from the image data being the selection target is included in the target image and the auxiliary image group. The similarity degree processing unit determines whether the search target person is captured in the image data by using an evaluation result by the face recognition unit. A determination result by the similarity degree processing unit is stored in the second database. The search result output unit acquires, from the first database, the image data determined that the search target person is captured, based on the determination result stored in the second database, and generates and outputs output data including the acquired image data.

As one aspect of the present example embodiment, an image indicating an associated person of the search target person is input as the auxiliary image to the face recognition unit.

As one aspect of the present example embodiment, the face recognition unit calculates a similarity degree between a face detected from the image data and a face of a person included in the target image and the auxiliary image group. The similarity degree processing unit determines whether the search target person is captured in the image data, based on the similarity degree calculated for the target image and the auxiliary image group.

As one aspect of the present example embodiment, metadata of the image data being the selection target are stored in the first database. The similarity degree processing unit acquires the metadata of the image data being the selection target from the first database. The similarity degree processing unit determines whether the search target person is captured in the image data, based on the acquired metadata of the image data being the selection target and the similarity degree calculated for the target image and the auxiliary image group.

As one aspect of the present example embodiment, the similarity degree processing unit provides, to the image data, a similarity degree analysis indicating a certainty degree that the search target person is captured, based on the metadata of the image data being the selection target and the similarity degree calculated for the target image and the auxiliary image group.

As one aspect of the present example embodiment, the search result output unit is connected to the output device including the monitor. The search result output unit outputs the output data to the output device. The output device causes the monitor to display the first user interface for selecting the image data included in the output data.

The target image being an image indicating a search target person and the auxiliary image group including an auxiliary image being at least one person image that assists a search for the target image are input to the search system according to the present example embodiment. For example, a face image of a child of the user is input as the target image to the search system, and a face image of a friend of the child is input as the auxiliary image. When the target image and the auxiliary image are input, the search system according to the present example embodiment performs face recognition on the image data being a selection target stored in the first database. The search system according to the present example embodiment determines whether a search target person is captured in the image data by using an evaluation result of the face recognition and metadata of the image data about the search target image, based on a similarity degree evaluation.

For example, in a case in which a picture of a trip of a child is sold by a Web-based system, there is a high possibility that a child being a search target person is captured together with an associated person such as a close friend and/or a team member. According to the present example embodiment, whether the search target person is captured can also be verified for image data having a low similarity degree of the face recognition even though the search target person is captured, based on a similarity degree of the face recognition of the associated person.

Further, according to the present example embodiment, meta information (time information and/or positional information) of the image data can be included for the verification of whether the search target person is captured in the image data. For example, the search target person is not captured in a plurality of pieces of image data captured at different places at the same time. Thus, any of the plurality of pieces of image data captured at the different places at the same time can be excluded from the search result.

In the present example embodiment, a determination result by each evaluation of these is accumulated in the second database. According to the present example embodiment, an image confirmed by the user can be chosen by sorting out images in which the search target person is captured from the image database according to the determination result accumulated in the second database and outputting the images.

When the search system according to the present example embodiment extracts image data in which the search target person is captured from multiple pieces of image data, the search system uses a determination result indicating presence or absence of an associated person of the search target person and/or metadata such as time information and/or positional information together. Thus, the search system according to the present example embodiment can increase search accuracy further than that of a search using only face recognition of the search target person.

For example, when an image captured at a school event in which a child of the user participates is purchased, the user has parental love that the user desires to purchase even an image in which the child does not face forward. According to the present example embodiment, not only a face image recognition result of the search target person, but also a search result of an associated person who is more likely to act together with the search target person and/or a behavior history (time information and/or positional information) are referred together. Thus, according to the present example embodiment, a possibility of failing to notice an image in which the search target person is captured can be eliminated with high accuracy, and a more highly accurate search result can be provided.

Further, due to social conditions where privacy protection regulations are becoming stricter, there is a limit to improvement of search accuracy by using a social human relationship graph (social graph) using an external system such as a social networking service and/or a shared calendar app. According to the present example embodiment, search accuracy of a human relationship can be improved in a closed environment without requiring cooperation with the external system, and thus it is safe in terms of privacy protection.

In other words, the search system according to the present example embodiment can search for a target person in a safe and highly accurate manner, based on a human relationship, without cooperating with the external system.

Second Example Embodiment

Next, a search system according to a second example embodiment of the example embodiments will be described with reference to drawings. The present example embodiment is different from the first example embodiment in that an image (also referred to as a candidate image) being a candidate for a target image and/or an auxiliary image is generated from among image data stored in an image DB, and the generated candidate image is proposed to a user.

(Configuration)

Figure 6:
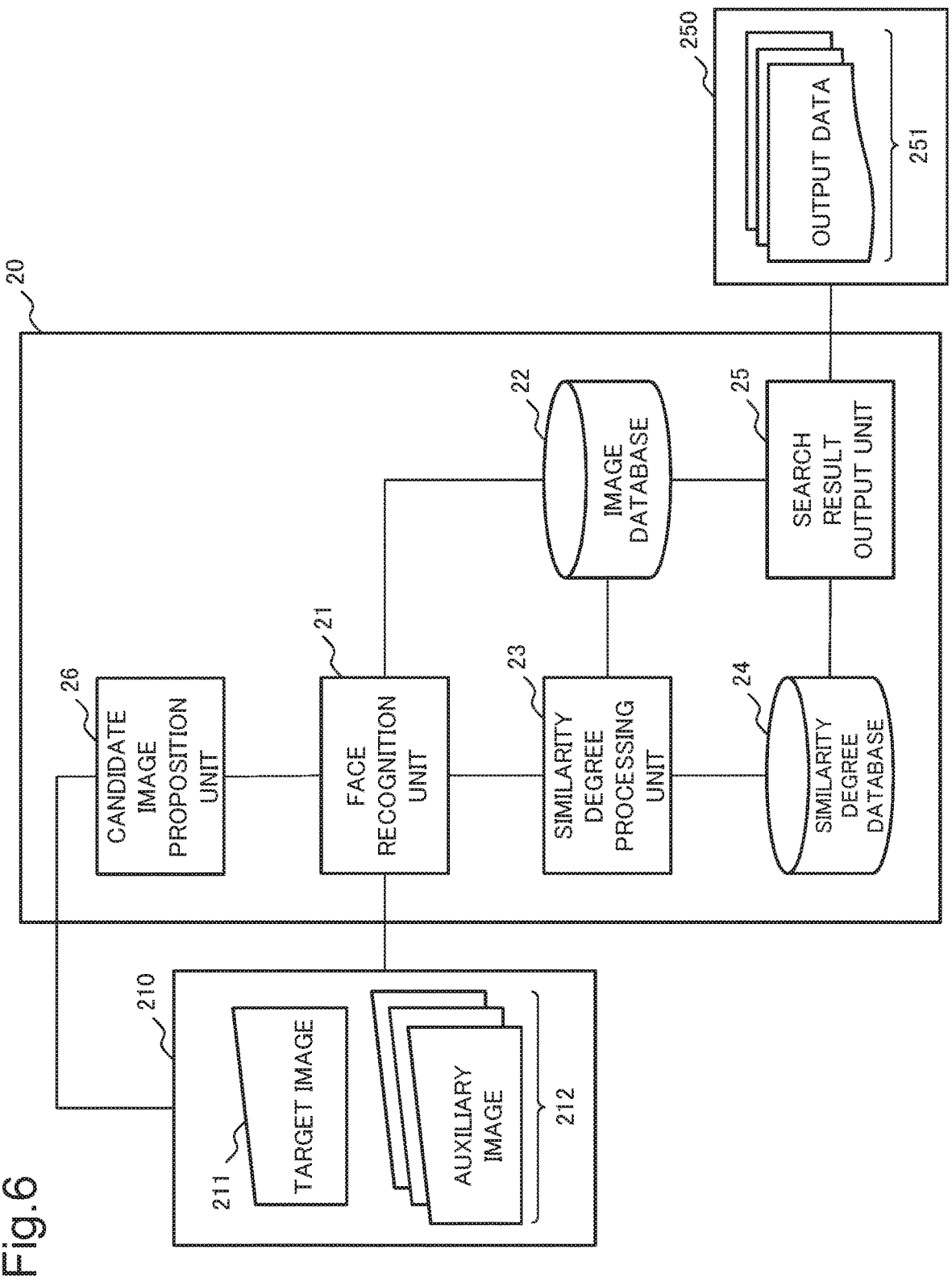
FIG. 6 is a block diagram illustrating one example of a configuration of a search system according to a second example embodiment.

FIG. 6 is a block diagram illustrating one example of a configuration of a search system 20 according to the present example embodiment. As in FIG. 6, the search system 20 includes a face recognition unit 21, an image DB 22, a similarity degree processing unit 23, a similarity degree DB 24, a search result output unit 25, and a candidate image proposition unit 26. The search system 20 is connected to an input device 210 and an output device 250.

The search system 20 detects a face from at least one piece of image data being a selection target stored in the image DB 22. The search system 20 outputs an image including the detected face as a candidate image of a target image and/or an auxiliary image to the input device 210. The user selects a target image and/or an auxiliary image from among the candidate images displayed on the input device 210, and designates the selected target image and/or the selected auxiliary image. The search system 20 searches for image data in which a search target person is captured from among image data stored in the image DB 22 by using a target image 211 and an auxiliary image group 212 designated by the user via the input device 210. The search system 20 generates output data including the searched image data. The search system 20 outputs an output data group 251 being a set of the generated output data to the output device 250.

The input device 210 is connected to the face recognition unit 21 and the candidate image proposition unit 26. A candidate image of a target image and/or an auxiliary image is input to the input device 210 from the candidate image proposition unit 26. The input device 210 causes a monitor to display a user interface for selecting the target image 211 and/or the auxiliary image from among the input candidate images. The input device 210 designates the candidate image selected via the user interface as the target image 211 or the auxiliary image group 212. At this time, the input device 210 outputs, to the search system 20, information indicating which candidate image is designated as the target image 211 or the auxiliary image group 212. Further, the input device 210 may output, to the search system 20, image data designated as the target image 211 or the auxiliary image group 212.

Figure 7:
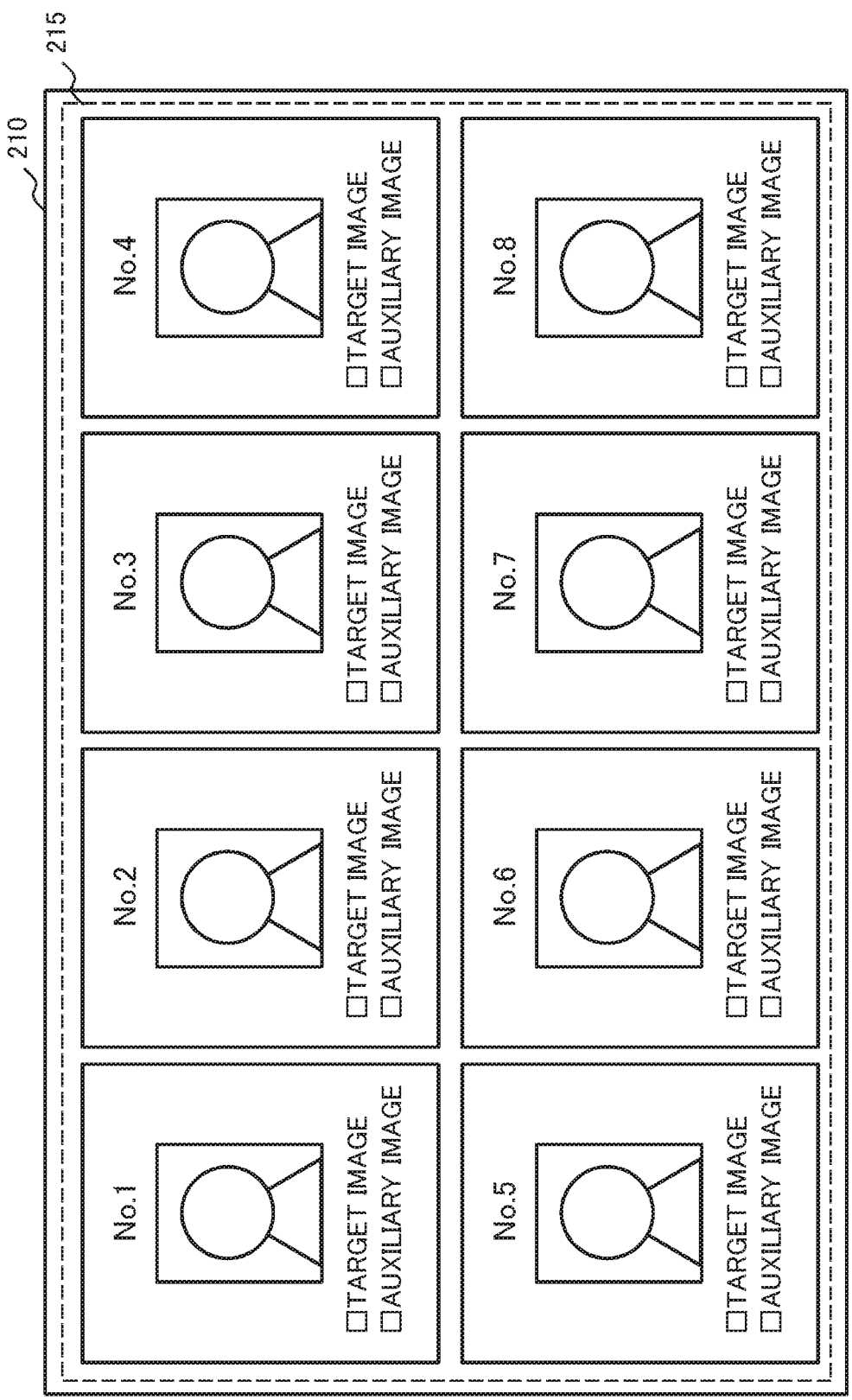
FIG. 7 is a schematic diagram illustrating one example of causing a monitor to display a candidate image output from the search system according to the second example embodiment.

FIG. 7 is a schematic diagram illustrating one example of a user interface 215 (also referred to as a second user interface) for presenting a candidate image to a user on the monitor of the input device 210. A plurality of candidate images are displayed on the user interface 215 in FIG. 7. On the user interface 215, a check box for selecting a target image or an auxiliary image is displayed in association with each of the candidate images.

Figure 8:
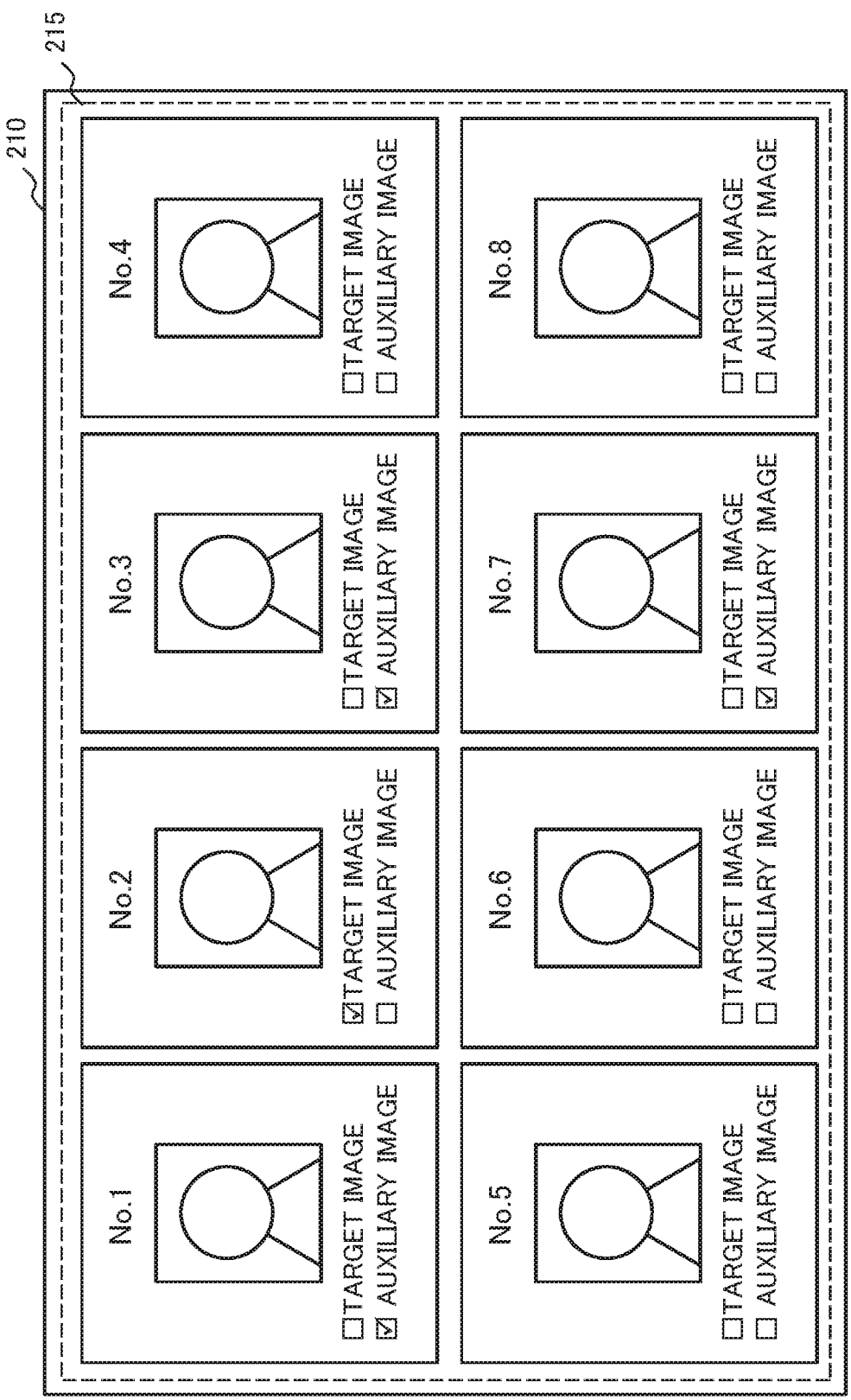
FIG. 8 is a schematic diagram illustrating another example of causing the monitor to display a candidate image output from the search system according to the second example embodiment.

FIG. 8 is one example of a state after the user who confirms the user interface 215 in FIG. 7 selects the target image and the auxiliary image. In FIG. 8, as one example, a candidate image of No. 2 is selected as the target image 211, candidate images of No. 1, 3, and 7 are selected as the auxiliary images. The input device 210 designates the candidate image selected on the user interface 215 as the target image 211 or the auxiliary image that includes the auxiliary image group 212.

The candidate image proposition unit 26 acquires, from the face recognition unit 21, an image including a face detected from image data being a selection target. The candidate image proposition unit 26 generates a candidate image of a search target image and an auxiliary image by using the acquired image. The candidate image proposition unit 26 outputs the generated candidate image to the input device 210.

The face recognition unit 21 is connected to the input device 210. Further, the face recognition unit 21 is connected to the image DB 22, the similarity degree processing unit 23, and the candidate image proposition unit 26.

The face recognition unit 21 acquires at least one piece of image data being a selection target stored in the image DB 22. The face recognition unit 21 detects a face from the acquired image data. The face recognition unit 21 outputs an image including the face detected from the image data being the selection target to the candidate image proposition unit 26. The face recognition unit 21 may store the image including the face detected from the image data being the selection target in the image DB 22, and may delete the image once.

Further, information indicating which candidate image is designated as the target image 211 and the auxiliary image group 212 is input to the face recognition unit 21 from the input device 210. When receiving the designation of the target image 211 and the auxiliary image group 212, the face recognition unit 21 performs calculation of a similarity degree between the face detected from the image data being the selection target, and the target image 211 and the auxiliary image group 212. The face recognition unit 21 outputs a calculation result (also referred to as an evaluation result) of the similarity degree between the face detected from the image data being the selection target, and the target image 211 and the auxiliary image group 212 to the similarity degree processing unit 23.

The image DB 22 (also referred to as a first database) is connected to the face recognition unit 21, the similarity degree processing unit 23, and the search result output unit 25. The image DB 22 is a database in which image data being a selection target are stored.

The similarity degree processing unit 23 is connected to the face recognition unit 21, the image DB 22, and the similarity degree DB 24. The similarity degree processing unit 23 acquires an evaluation result of face recognition from the face recognition unit 21. When acquiring the evaluation result of the face recognition, the similarity degree processing unit 23 determines whether a search target person is captured in the image data stored in the image DB 22 by using metadata of the image data. The similarity degree processing unit 23 stores a determination result in the similarity degree DB 24.

The similarity degree DB 24 (also referred to as a second database) is connected to the similarity degree processing unit 23 and the search result output unit 25. The similarity degree DB 24 is a database in which a determination result of a similarity degree by the similarity degree processing unit 23 is stored.

The search result output unit 25 is connected to the image DB 22 and the similarity degree DB 24. The search result output unit 25 acquires the determination result by the similarity degree processing unit 23 from the similarity degree DB 24. The search result output unit 25 acquires image data from the image DB 22, based on the determination result acquired from the similarity degree DB 24. Then, the search result output unit 25 acquires, from the image DB 22, image data associated with the determination result acquired from the similarity degree DB 24. The search result output unit 25 generates output data (also referred to as a search result) in a form of being processable in the output device 230 by using the image data acquired from the image DB 22. Note that the search result output unit 25 may include, in the output data, the metadata of the image data associated with the determination result. The search result output unit 25 outputs the output data group 231 being a set of the generated output data to the output device 230.

The output device 230 is connected to the search result output unit 25. The output data group 231 is input to the output device 230 from the search result output unit 25. The output device 230 is a device for presenting a search result of the search system 20 to the user. Note that a method of outputting a search result of the search system 20 is not particularly limited to the manner as long as the user can confirm the search result.

The description above is description of the configuration of the search system 20 according to the present example embodiment. Note that the configuration of the search system 20 in FIG. 6 is one example, and does not limit the configuration of the search system 20 according to the present example embodiment to the manner as it is.

(Operation)

Figure 9:
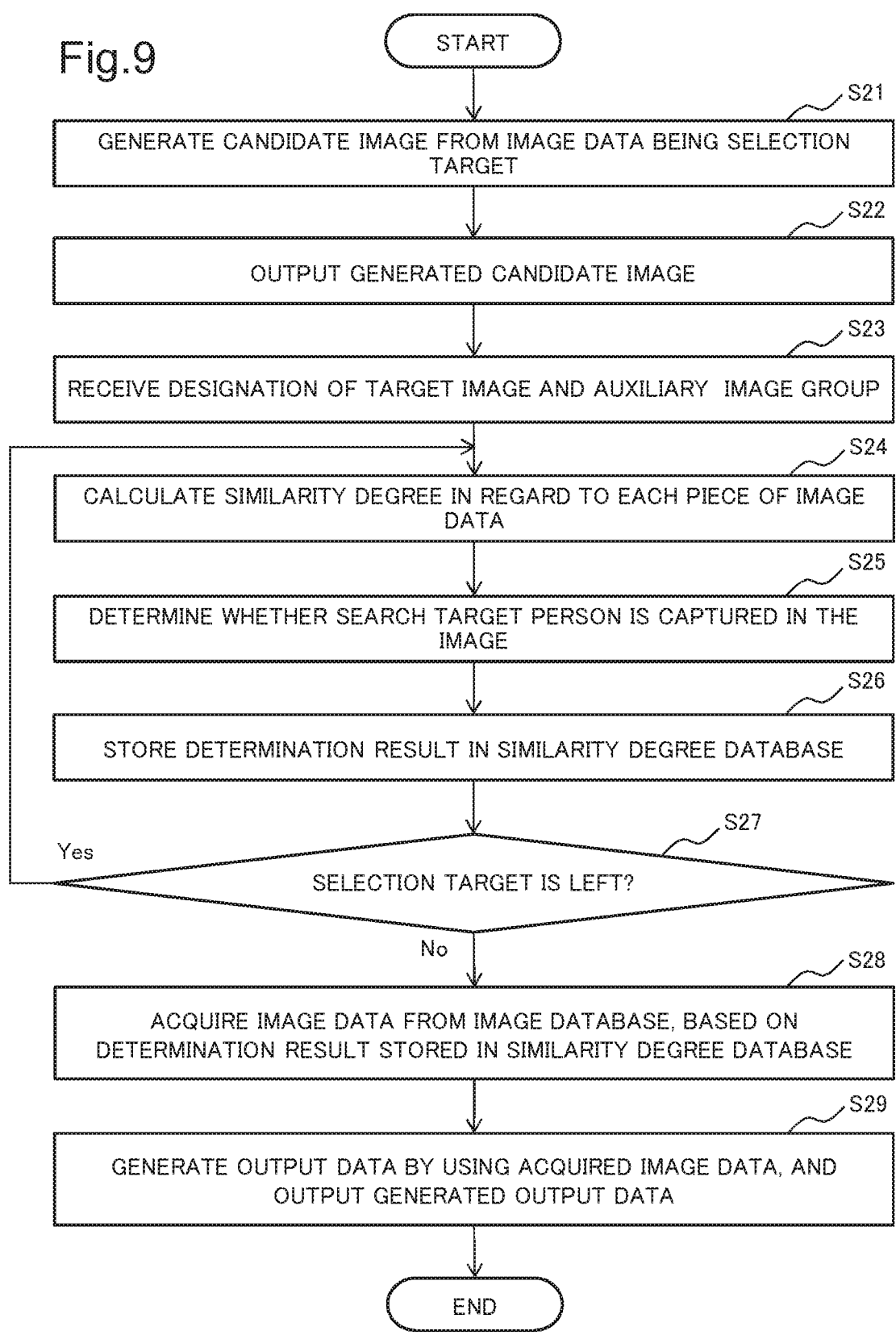
FIG. 9 is a flowchart for describing an operation of the search system according to the second example embodiment.

Next, an operation of the search system 20 according to the present example embodiment will be described with reference to a drawing. FIG. 9 is a flowchart for describing the operation of the search system 20. The operation of the search system 20 is subject in the description according to the flowchart in FIG. 9.

In FIG. 9, first, the search system 20 generates a candidate image from image data being a selection target stored in the image DB 22 (step S21).

Next, the search system 20 outputs the generated candidate image to the input device 210 (step S22).

Next, the search system 20 acquires information indicating which candidate image is designated as the target image 211 and the auxiliary image group 212 from the input device 210 (step S23).

Next, the search system 20 calculates a similarity degree between a face detected from the image data being the selection target, and the target image 211 and the auxiliary image group 212 (step S24).

Next, the search system 20 determines whether a search target person is captured in the image data stored in the image DB 22 by using the calculated similarity degree and metadata of the image data (step S25). Note that, when the metadata of the image data being the selection target are not used for the determination whether the search target person is captured in the image data, the search system 20 makes a determination by using the calculated similarity degree.

Next, the search system 20 stores, in the similarity degree DB 24, a determination result whether the search target person is captured in the image data being the selection target (step S26).

When the image data serving as the selection target are left (Yes in step S27), the processing returns to step S24. On the other hand, when the image data serving as the selection target are not left (No in step S27), image data are acquired from the image DB 22, based on the determination result stored in the similarity degree DB 24 (step S28). Then, the search system 20 generates output data by using the image data acquired from the image DB 22, and outputs the generated output data to the output device 230 (step S29).

The description above is description of the operation of the search system 20 according to the flowchart in FIG. 9. Note that the operation of the search system 20 according to the flowchart in FIG. 9 is one example, and does not limit the operation of the search system 20 according to the present example embodiment to the procedure as it is.

As described above, the search system according to the present example embodiment includes the candidate image proposition unit in addition to the first database, the face recognition unit, the similarity degree processing unit, the second database, and the search result output unit.

The face recognition unit acquires at least one piece of image data stored in the first database, detects a face from the acquired image data, and outputs the image data including the detected face to the candidate image proposition unit. The candidate image proposition unit generates the candidate image of the target image and the auxiliary image by using the image including the face detected by the face recognition unit, and outputs the generated candidate image.

As one manner of the present example embodiment, the candidate image proposition unit is connected to the input device including the monitor, and outputs the candidate image to the input device. The input device causes the monitor to display the second user interface for selecting the target image and the auxiliary image from among the candidate images. The input device designates each of the candidate images selected via the second user interface as any of the target image and the auxiliary image, and outputs information related to the designated target image and the designated auxiliary image to the face recognition unit.

In general, there are many cases in which image data about a child of a user are kept at hand, but appropriate image data about a friend that need to be an auxiliary image are not kept at hand. In the present example embodiment, a candidate image generated by using a face image detected from the image data being the selection target stored in the first database is presented to the user, and a target image and an auxiliary image are selected by the user from the candidate images. As a result, the user can save time and effort for procuring the auxiliary image that is not kept at hand.

For example, the search system according to the present example embodiment extracts a plurality of person images that are assumed as another person from the first database, and outputs and displays a thumbnail and/or a full-size image of the person images as data in html format as a link format. The user can check the image displayed on the monitor, and/or select a picture of a search target person and/or an associated person by a click or a tap. At this time, in a case of a great number of target people, candidate images are displayed separately on a plurality of pages. For example, an operation burden of the user can also be reduced by prioritizing and displaying a person image determined to be closely associated by similarity degree calculation.

A technique according to each of the example embodiments of the example embodiments is effective for a person image search in which a search target ranges up to a great number of people even in a relatively closed human relationship as in a case in which a picture captured at a school event such as a trip or an arts festival is sold by a Web-based system.

For example, an enormous effort is required to search for a target image in which a target person is captured while referring to multiple pieces of image data in which a person who is not a target is captured one by one. Using the face recognition technique can save an effort as compared to a case in which a target image is searched while referring all image data one by one. However, a target image cannot be accurately detected with detection accuracy of the current face recognition technique when a target person looks aside or slantingly, and the like.

For an adult whose human relationship and/or behavior history are accumulated, a target image can be searched by using the human relationship and/or the behavior history extracted from a social networking service, a shared calendar app, and/or the like, and thus search accuracy can be improved. However, when an image of a child whose human relationship and/or behavior history are not accumulated is searched, search accuracy of a target image may not necessarily improve even by using the social networking service, the shared calendar app, and/or the like. Further, due to social conditions where privacy protection regulations become strict, it is becoming difficult to publicly use information of the social networking service, the shared calendar app, and/or the like.

Further, the technique according to each of the example embodiments of the example embodiments can search for a target image by using a face of a search target person together with a face of an associated person of the search target person without using information of an external system, such as a social networking service and/or a shared calendar app.

In other words, the search system according to the present example embodiment can search for a target person in a safe and highly accurate manner, based on a human relationship, without cooperating with the external system.

(Hardware)

Herein, a hardware configuration that performs processing of the search system according to each of the example embodiments of the example embodiments will be described by taking an information processing device 90 in FIG. 10 as one example. Note that the information processing device 90 in FIG. 10 is a configuration example for performing the processing of the search system according to each of the example embodiments, and does not limit the scope of the example embodiments.

Figure 10:
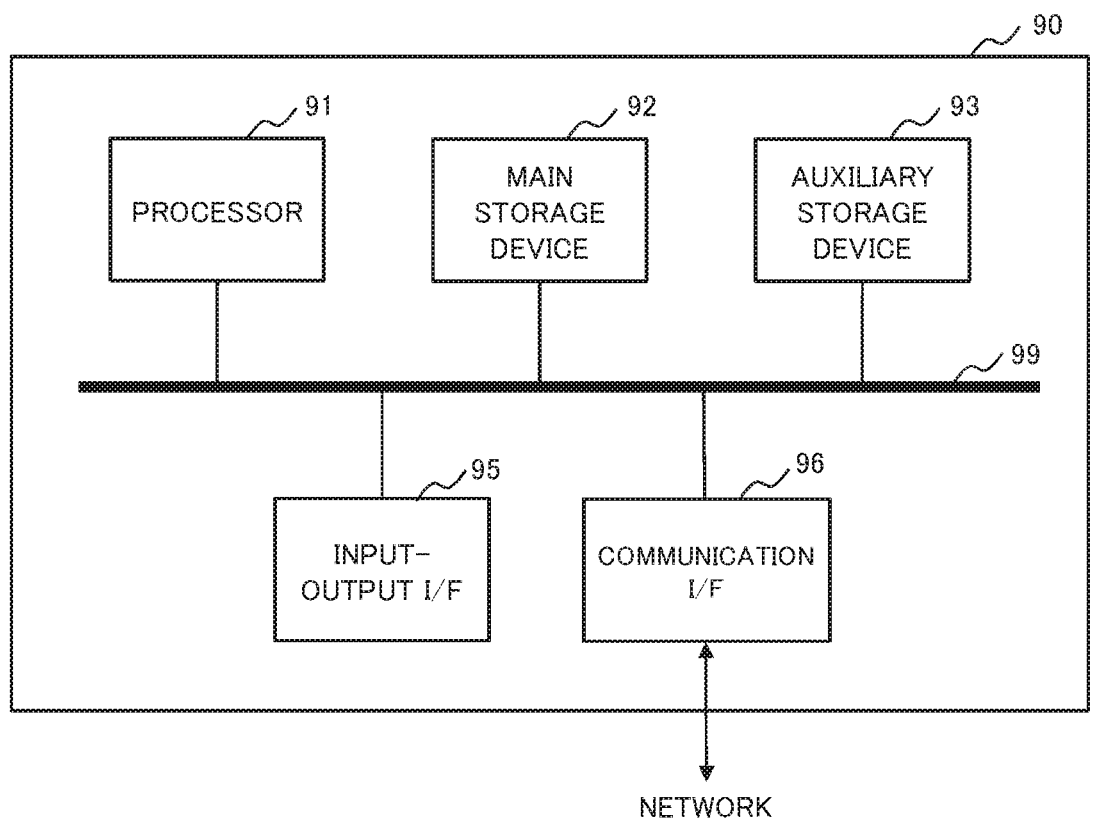
FIG. 10 is a block diagram illustrating one example of a hardware configuration that achieves the search system according to each of the example embodiments.

As in FIG. 10, the information processing device 90 includes a processor 91, a main storage device 92, an auxiliary storage device 93, an input-output interface 95, and a communication interface 96. In FIG. 10, the interface is indicated by being abbreviated as I/F (Interface). The processor 91, the main storage device 92, the auxiliary storage device 93, the input-output interface 95, and the communication interface 96 are connected to one another via a bus 99 in such a way as to be able to carry out data communication. Further, the processor 91, the main storage device 92, the auxiliary storage device 93, and the input-output interface 95 are connected to a network such as the Internet and/or an intranet via the communication interface 96.

The processor 91 develops a program stored in the auxiliary storage device 93 and the like in the main storage device 92, and executes the developed program. In the present example embodiment, the information processing device 90 may be configured to use a software program installed in the information processing device 90. The processor 91 performs the processing by the search system according to the present example embodiment.

The main storage device 92 has a region in which a program is developed. The main storage device 92 may be a volatile memory such as a dynamic random access memory (DRAM), for example. Further, a non-volatile memory such as a magnetoresistive random access memory (MRAM) may be formed and added as the main storage device 92.

The auxiliary storage device 93 stores various types of data. The auxiliary storage device 93 is formed of a local disc such as a hard disc and/or a flash memory. Note that the main storage device 92 may be configured to store various types of data, and the auxiliary storage device 93 can be omitted.

The input-output interface 95 is an interface for connecting the information processing device 90 to a peripheral apparatus. The communication interface 96 is an interface for connection to an external system and/or an external device through a network such as the Internet and/or an intranet, based on a standard and/or a specification. The input-output interface 95 and the communication interface 96 may be standardized as an interface for connection with an external apparatus.

Input apparatuses, such as a keyboard, a mouse, and/or a touch panel, may be configured to be connected to the information processing device 90 if necessary. These input apparatuses are used to input information and/or setting. Note that when a touch panel is used as an input apparatus, a display screen of a display apparatus may be configured to function as an interface of the input apparatus. Data communication between the processor 91 and the input apparatus may be intervened by the input-output interface 95.

Further, the information processing device 90 may be equipped with a display apparatus for displaying information. When the information processing device 90 is equipped with the display apparatus, the information processing device 90 is preferably provided with a display control device (not illustrated) for controlling display of the display apparatus. The display apparatus may be connected to the information processing device 90 via the input-output interface 95.

Further, the information processing device 90 may be equipped with a disc drive as necessary. The disc drive is connected to the bus 99. The disc drive intervenes between the processor 91 and a recording medium (program recording medium), which is not illustrated, in reading of data and a program from the recording medium, writing of a processing result of the information processing device 90 to the recording medium, and the like. The recording medium can be achieved by an optical recording medium such as a compact disc (CD) and/or a digital versatile disc (DVD), for example. Further, the recording medium may be achieved by a semiconductor recording medium such as a universal serial bus (USB) memory and/or a secure digital (SD) card, a magnetic recording medium such as a flexible disc, and/or other recording medium.

One example of the hardware configuration for achieving the search system according to each of the example embodiments is described above. Note that the hardware configuration in FIG. 10 is one example of a hardware configuration for performing arithmetic processing of the search system according to each of the example embodiments, and does not limit the scope of the example embodiments. Further, a program that causes a computer to perform processing related to the search system according to each of the example embodiments is also included in the scope of the example embodiments. Furthermore, a program recording medium that records a program according to each of the example embodiments is also included in the scope of the example embodiments.

While the example embodiments has been particularly shown and described with reference to example embodiments thereof, the example embodiments is not limited to these embodiments. It will be understood by those of ordinary skill in the art that various changes in form and details may be made therein without departing from the spirit and/or scope of the present example embodiments as defined by the claims.

The invention claimed is:

1. A search system, comprising:
a database in which at least one piece of image data being a selection target and metadata of the image data being the selection target are stored;
at least one memory storing instructions; and
at least one processor connected to the at least one memory and configured to execute the instructions to:
detect a face from the image data being the selection target stored in the database;
evaluate, when a target image indicating a search target person and an auxiliary image group including at least one auxiliary image that assists a search for the search target person are designated, whether a face detected from the image data being the selection target is included in the target image and the auxiliary image group;
determine whether the search target person is captured in the image data, by using an evaluation result;
acquire, from the database, the image data determined that the search target person is captured, based on a determination result;
calculate a similarity degree between a face detected from the image data and a face of a person included in the target image and the auxiliary image group;
acquire metadata of the image data being the selection target from the database;
determine whether the search target person is captured in the image data, based on the acquired metadata of the image data being the selection target and the similarity degree calculated for the target image and the auxiliary image group; and
output a search result including the acquired image data.

2. The search system according to claim 1, wherein an image indicating an associated person of the search target person is provided as the auxiliary image.

3. The search system according to claim 1, wherein the at least one processor is configured to execute the instructions to
determine whether the search target person is captured in the image data, based on the similarity degree calculated for the target image and the auxiliary image group.

4. The search system according to claim 1, wherein the at least one processor is configured to execute the instructions to provide, for the image data, a similarity degree analysis indicating a certainty degree that the search target person is captured, based on the metadata of the image data being the selection target and the similarity degree calculated for the target image and the auxiliary image group.

5. The search system according to claim 4, wherein the search system is connected to an output device including a monitor,
the at least one processor is configured to execute the instructions to output the search result to the output device, and
the output device causes the monitor to display a first user interface for selecting the image data included in the search result.

6. The search system according to claim 1, wherein the at least one processor is configured to execute the instructions to:
acquire at least one piece of the image data stored in the database; and
generate a candidate image of the target image and the auxiliary image by using an image including the detected face.

7. The search system according to claim 6, wherein the search system is connected to an input device including a monitor, the at least one processor is configured to execute the instructions to output the candidate image to the input device, and the input device causes the monitor to display a second user interface for selecting the target image and the auxiliary image from among a plurality of candidate images including the candidate image, designates each candidate image selected via the second user interface as any of the target image and the auxiliary image, and outputs information related to the designated target image and the designated auxiliary image to the search system.

8. A search method performed by a computer, the search method comprising:

detecting a face from at least one piece of image data being a selection target stored in a database;

evaluating, when a target image indicating a search target person and an auxiliary image group including at least one auxiliary image that assists a search for the search target person are designated, whether a face detected from the image data being the selection target is included in the target image and the auxiliary image group;

determining whether the search target person is captured in the image data, by using an evaluation result; and acquiring, from the database, the image data determined that the search target person is captured, based on a determination result;

calculating a similarity degree between a face detected from the image data and a face of a person included in the target image and the auxiliary image group;

acquiring metadata of the image data being the selection target from the database;

determining whether the search target person is captured in the image data, based on the acquired metadata of the image data being the selection target and the similarity degree calculated for the target image and the auxiliary image group; and outputting a search result including the acquired image data.

9. The search method according to claim 8, wherein an image indicating an associated person of the search target person is provided as the auxiliary image.

10. The search method according to claim 8, further comprising determining whether the search target person is captured in the image data, based on the similarity degree calculated for the target image and the auxiliary image group.

11. The search method according to claim 8, further comprising providing, for the image data, a similarity degree analysis indicating a certainty degree that the search target person is captured, based on the metadata of the image data being the selection target and the similarity degree calculated for the target image and the auxiliary image group.

12. The search method according to claim 8, further comprising outputting the search result to an output device including a monitor, and causing the monitor to display a first user interface for selecting the image data included in the search result.

13. A non-transitory program recording medium that records a program causing a computer to perform:

processing of detecting a face from at least one piece of image data being a selection target stored in a database;

processing of evaluating, when a target image indicating a search target person and an auxiliary image group including at least one auxiliary image that assists a search for the search target person are designated, whether a face detected from the image data being the selection target is included in the target image and the auxiliary image group;

processing of determining whether the search target person is captured in the image data, by using an evaluation result; and processing of acquiring, from the database, the image data determined that the search target person is captured, based on a determination result;

processing of calculating a similarity degree between a face detected from the image data and a face of a person included in the target image and the auxiliary image group;

processing of acquiring metadata of the image data being the selection target from the database;

processing of determining whether the search target person is captured in the image data, based on the acquired metadata of the image data being the selection target and the similarity degree calculated for the target image and the auxiliary image group; and processing of outputting a search result including the acquired image data.

14. The non-transitory program recording medium according to claim 13, wherein an image indicating an associated person of the search target person is provided as the auxiliary image.

15. The non-transitory program recording medium according to claim 13, wherein the program causes the computer to further perform:

processing of determining whether the search target person is captured in the image data, based on the similarity degree calculated for the target image and the auxiliary image group.

16. The non-transitory program recording medium according to claim 13, wherein the program causes the computer to further perform:

processing of providing, for the image data, a similarity degree analysis indicating a certainty degree that the search target person is captured, based on the metadata of the image data being the selection target and the similarity degree calculated for the target image and the auxiliary image group.

17. The non-transitory program recording medium according to claim 13, wherein the program causes the computer to further perform:

processing of outputting the search result to an output device including a monitor, and processing of causing the monitor to display a first user interface for selecting the image data included in the search result.

* * * * *